US008786942B2

(12) United States Patent
Palese et al.

(10) Patent No.: US 8,786,942 B2
(45) Date of Patent: Jul. 22, 2014

(54) COHERENTLY PHASE COMBINED, HIGH CONTRAST, PULSED OPTICAL FIBER AMPLIFIER ARRAY

(75) Inventors: Stephen P. Palese, Redondo Beach, CA (US); Eric C. Cheung, Torrance, CA (US); Gregory D. Goodno, Los Angeles, CA (US); Chun-Ching Shih, Palos Verdes Estates, CA (US); Mark E. Weber, Hawthorne, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 195 days.

(21) Appl. No.: 13/495,374

(22) Filed: Jun. 13, 2012

(65) Prior Publication Data
US 2013/0336344 A1    Dec. 19, 2013

(51) Int. Cl.
  *H04B 10/17* (2006.01)
  *H01S 3/23* (2006.01)
  *H01S 3/067* (2006.01)

(52) U.S. Cl.
  CPC .......... *H01S 3/2383* (2013.01); *H01S 3/2308* (2013.01); *H01S 3/06754* (2013.01)
  USPC ....................................... 359/349; 359/341.1

(58) Field of Classification Search
  CPC ............ H01S 3/06754; H01S 3/10053; H01S 3/1003; H01S 3/2383; H01S 3/2308; G02B 6/4249
  USPC .............................................. 359/341.1, 349
  See application file for complete search history.

(56) References Cited

U.S. PATENT DOCUMENTS

| 6,366,356 | B1 | 4/2002 | Brosnan et al. |
| 6,404,784 | B2 | 6/2002 | Komine |
| 6,466,706 | B1 | 10/2002 | Go et al. |
| 6,708,003 | B1 | 3/2004 | Wickham et al. |
| 7,088,743 | B2 | 8/2006 | Rice et al. |
| 7,221,499 | B2 | 5/2007 | Rice et al. |
| 7,336,363 | B2 | 2/2008 | Rothenberg |

(Continued)

FOREIGN PATENT DOCUMENTS

| JP | 2011254028 | 12/2011 |
| JP | 2012004311 | 1/2012 |
| WO | 00/72046 | 11/2000 |

OTHER PUBLICATIONS

Xinyang Li et al; "Coherent beam combining of collimated fiber array based on target-in-the-loop technique", Proc. SPIE 8178, 81780M (2011); http://dx.doi.org/10.1117/12.897153.

(Continued)

*Primary Examiner* — Eric Bolda
(74) *Attorney, Agent, or Firm* — Carmen Patti Law Group, LLC

(57) ABSTRACT

A pulsed fiber array laser system that has actively stabilized coherent beam combination (CBC) is disclosed. The active stabilization is accomplished using both piston phase control and intra-pulse phase control, allowing a much greater increase in pulse energy. Further stabilization using intra-pulse amplitude control is also disclosed. A chirp profile can be written on the output pulse to enable specific applications. An amplitude profile of the amplifier array may optionally be tailored to match to a reference electrical pulse. Using the current invention, a much smaller number of amplifier chains will be needed to achieve certain pulse energy, resulting in a system with lower complexity, lower cost, smaller size, less weight, and higher reliability.

17 Claims, 8 Drawing Sheets

(56) References Cited

U.S. PATENT DOCUMENTS

2009/0201575 A1* 8/2009 Fermann et al. .......... 359/341.32
2010/0142573 A1* 6/2010 Minden .................... 372/29.016
2013/0034114 A1* 2/2013 Schill et al. ..................... 372/18

OTHER PUBLICATIONS

Pu Zhou et al; "Active and passive coherent beam combining of thulium-doped fiber lasers", Proc. SPIE 7843, 784307 (2010); http://dx.doi.org/10.1117/12.870646.

T. M. Shay et al; "Self-referenced locking of optical coherence by single-detector electronic-frequency tagging", Proc. SPIE 6102, 61020V (2006); http://dx.doi.org/10.1117/12.646634.

T. J. Wagner; "Fiber laser beam combining and power scaling progress: Air Force Research Laboratory Laser Division", Proc. SPIE 8237, 823718 (2012); http://dx.doi.org/10.1117/12.912154.

Zhou Pu et al (College of Opticelectric Science and Engineering, National University of Defense Technology, Changsha 410073, People's Republic of China ); "Coherent beam combination of two-dimensional high power fiber amplifier array using stochastic parallel gradient descent algorithm", Applied Physics Letters, vol. 94, Issue 23 pp. 231106-231106-3 (Jun. 2009).

Leo A. Siiman et al. (Center for Ultrafast Opt. Sci., Univ. of Michigan, Ann Arbor, MI, USA ); "Femtosecond pulses from coherently combined parallel chirped pulse fiber amplifiers", Lasers and Electro-Optics (CLEO), 2011 Conference on, (May 1-6, 2011).

J. Bourderionnet et al. (Thales Res. & Technol., Palaiseau, France); "Coherent phase combining of 64 fibers" Lasers and Electro-Optics Europe (CLEO EUROPE/EQEC), 2011 Conference on and 12th European Quantum Electronics Conference (May 22-26, 2011).

L. Lombard et al. (French Aerosp. Lab., Onera, Palaiseau, France); "Coherent beam combination of pulse fiber amplifiers in 100ns-pulse regime", Lasers and Electro-Optics Europe (CLEO EUROPE/EQEC), 2011 Conference on and 12th European Quantum Electronics Conference (May 22-26, 2011).

Monica Minden et al. (HRL Labs., LLC, Malibu, CA); "Coherent combining of fiber lasers", Lasers and Electro-Optics Europe, 2005. CLEO/Europe. 2005 Conference on (Jun. 17, 2005).

S.J. Augst et al. (Lincoln Lab., MIT, Lexington, MA, USA); "Wavelength beam combining of laser arrays", Lasers and Electro-Optics Society, 2003. LEOS 2003. The 16th Annual Meeting of the IEEE vol. 2, (Oct. 27-28, 2003).

Stephen Palese et al; Coherent combining of pulsed fiber amplifiers in the nonlinear chirp regime with intra-pulse phase control; Optics Express 7422; Mar. 26, 2012; vol. 20, No. 7; 2012 OSA.

Bourbon, Pierre et al; Coherent combining of low-peak-power pulsed fiber amplifiers with 80-ns. pulse duration; Fiber Lasers VIII: Technology, Systems and Applications, SPIE, 1000 20th St., Bellingham, WA 98225-6705; USA; vol. 7914, No. 1; Feb. 10, 2011; pp. 1-7; XP060010528; DOI: 10.1117/12.875165 [retrieved on Jan. 1, 1901].

* cited by examiner

COHERENTLY PHASE COMBINED, HIGH CONTRAST, PULSED OPTICAL FIBER AMPLIFIER ARRAY

STATEMENT OF GOVERNMENT RIGHTS

"The Government of the United States of America, specifically, the Department of the Air Force, has rights in this invention pursuant to Government Contract No. FA8650-10-C-7033".

BACKGROUND

High power lasers are important for use in numerous industrial and military applications. Depending on the application, lasers can be operated in a continuous wave mode (CW) where the power output is essentially continuous over time or in a pulsed mode where the output takes the form of pulses of light of various durations and repetition rates. As more applications for lasers are found, there is a need to increase the power output of lasers. This has been limited by thermal effects which cause the laser beam quality to deteriorate. One way to increase the power output of a laser is to use solid-state lasers such as fiber lasers which are less prone to thermal effects. Fiber lasers that operate in both CW and pulsed modes have been developed, however short pulsed (<10 nsec) fiber array lasers have received less attention in the prior art.

Active fibers (glass fibers that have been doped with laser-active ions) offer the most electrically efficient, highest brightness laser source but are limited in the short pulse regime by non-linearities to approximately 250 KW peak power (250 µJ/pulse at 1 nsec) for conventional Large Mode Area (LMA) fibers and approximately 1 MW (1 mJ/pulse at 1 nsec) for Photonic Crystal Fibers (PCFs). When using active fibers, there are two approaches taken to scale the peak power handling. The first is to make even larger single mode fiber areas. This is difficult due to the index of refraction ($<10^{-5}$) control necessary for single mode waveguide operation. The second approach is to combine multiple fibers into a fiber array. Techniques to combine multiple fiber outputs include:

Incoherent: the fibers are simply tiled side by side.

Spectral: Each fiber operates at a slightly different wavelength and the outputs are combined with a wavelength dispersive optic (such as a grating or prism).

Coherent: Each fiber is essentially an arm of a large interferometer and active phase control of each arm is necessary to match the phase fronts at the combination optic.

Actively stabilized coherent beam combination (CBC) of an array of fiber amplifier chains into a single coherent beam is a valuable method to multiply the output power or pulse energy by the number of amplifier chains. Prior art techniques only control the piston phase of pulsed fiber amplifiers, and thus, can only combine well matched amplifiers with less than approximately ⅛ wave of phase variation over the pulse. As a result, the output pulse energy from each pulsed fiber amplifier chain is limited to only a fraction of the stimulated-Raman-scattering (SRS) limited output. This type of system is disclosed in U.S. Pat. No. 7,502,395 issued May 10, 2009 and incorporated by reference.

Thus, a need exists for a method and apparatus that can phase fiber amplifiers with arbitrarily large phase variations up to coherent combining at the SRS limited output. This would be a factor of 10 increase in pulse energy. In addition, for some Lidar applications, extreme high contrast ratio (>100 dB) is required and a method and apparatus satisfying this criteria is needed.

SUMMARY

In accordance with the teachings of the present invention, a pulsed optical fiber amplifier chain array with improved coherent beam combining is disclosed. Active phase stabilization is achieved by combining piston phase control with intra-pulse phase control.

In one embodiment, there is provided a coherently phase combined pulsed optical fiber amplifier chain array having a phase adjuster in each amplifier chain, each phase adjuster receiving a phase adjusting signal, each phase adjuster adjusting the phase of an pulsed input signal beam, a piston phase controller for receiving outputs from the fiber amplifier chain array and generating a piston phase control signal, an intra-pulse phase controller for receiving a frequency-shifted reference beam and generating an intra-pulse phase control signal and a combining element for receiving the piston phase control signal and the intra-pulse phase control signal and providing the phase adjusting signal to the phase adjusters for adjusting the phase of its input signal beam.

In another embodiment, there is provided a pulsed laser array system comprising a beam generating sub-system for generating a pulsed signal beam and one or more reference beams that are frequency locked together, a beam splitter for splitting the pulsed signal beam into a plurality of split pulsed signal beams for a plurality of fibers, an array of amplifier chains including at least one amplifier for amplifying each split pulsed signal beam, a phase adjuster in each amplifier chain, each phase adjuster receiving a phase adjusting signal, a piston phase controller for receiving the amplified split pulsed signal beams generating a piston phase control signal, an intra-pulse phase controller for receiving a frequency-shifted reference beam and generating an intra-pulse phase control signal and a combining element for receiving the piston phase control signal and the intra-pulse phase control signal and providing the phase adjusting signal to the phase adjusters for adjusting the phase of the split pulsed signal beams to be in phase with the reference beams.

In another embodiment, there is provided a method of coherently phase combining an array of optical fiber amplifier chains, having the steps of generating a pulsed signal beam and one or more reference beams that are frequency locked together, splitting the pulsed signal beam into a plurality of split pulsed signal beams for a plurality of fibers, sending the split pulsed signal beams through an array of amplifier chains including at least one amplifier for amplifying each split pulsed signal beam, providing a phase adjuster in each amplifier chain, each phase adjuster receiving a phase adjusting signal, receiving the amplified split pulsed signal beams and generating a piston phase control signal, receiving a frequency-shifted reference beam and generating an intra-pulse phase control signal, and combining the piston phase control signal and the intra-pulse phase control signal and providing the phase adjusting signal to the phase adjusters for adjusting the phase of the split pulsed signal beams to be in phase with the reference beams.

DESCRIPTION OF THE DRAWINGS

Features of example implementations of the invention will become apparent from the description, the claims, and the accompanying drawings in which:

DETAILED DESCRIPTION

Figure 1:
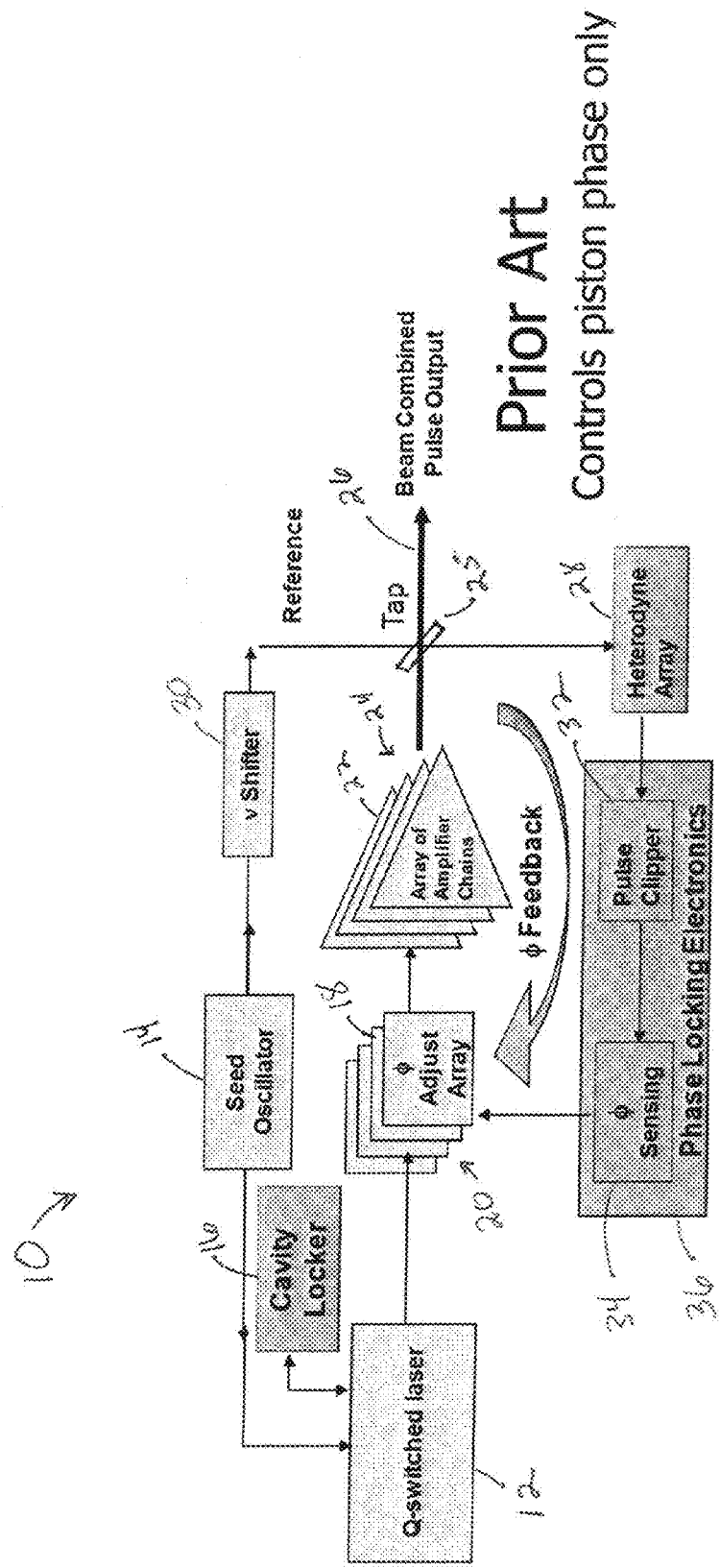
FIG. 1 is a schematic block diagram of a prior art pulsed fiber array laser with piston phase control.

FIG. 1 is a schematic diagram of a prior art apparatus for piston phase control of a pulsed coherent fiber array laser system. The system 10 includes a Q-switched laser for generating a signal pulse beam. A separate seed continuous wave oscillator 14 provides a reference beam and an injection seed beam for Q-switched laser 12. Cavity locker 16 locks the frequency and phase of the pulsed signal beam from Q-switched laser 12 to the frequency and phase of the injection seed beam. The operation of a Q-switched laser, an injection seed oscillator and a cavity locker in the combination shown in FIG. 1 is well-known to those skilled in the art. The Q-switched laser output beam is split into a plurality of pulsed fiber beams.

It would also be known to one of skill in the art that there are different techniques for generating and frequency locking a pulsed signal beam and a reference beam. For example, a continuous wave (CW) master oscillator and amplitude modulator could be used in place of Q-switched laser 12.

The piston phase control relies on the use of a small amount of beam leakage between the pulses from the laser to determine phase. In a Q-switched laser system, the beam leakage comes from the seed beam oscillator. For a CW system, the amplitude modulator has a finite contrast ratio so that a small amount of signal beam is leaked. Since the optical leakage and the signal beam pulses are derived from the same signal beam, the phase of the optical leakage is highly correlated, in fact phase-locked, with the signal beam pulses. The pulses from Q-switched laser 12 will typically be approximately 1-10 nsec in duration with an appropriate time between the pulses for the purposes described below. The pulsed signal beam from Q-switched laser 12 is split into a plurality of fiber beam channels, where a separate channel is provided for each fiber in the fiber array. As will be discussed in detail below, the optical leakage between the beam pulses in each fiber channel is locked to a reference beam by applying appropriate feedback to a phase adjuster 18 in an array 20 of phase adjusters. The coherent signal beam pulses in each fiber channel are then amplified by a chain of amplifiers 22 in an array of amplifier chains 24. The amplified signal beam pulses from each channel are then emitted and combined as a single coherent main beam 26 from system 10.

The reference beam from seed oscillator 14 is frequency shifted by a frequency shifter 30. The frequency shifter 30 shifts the frequency of the reference beam for heterodyne signal generation. The reference beam and main beam are coupled by beam splitter 25 then sent to a heterodyne array circuit 28 that converts the optical signal to an electrical signal. Any suitable detector array for this purpose can be used as the heterodyne array circuit 28, as will be appreciated by those skilled in the art.

As discussed above, system 10 measures the phase difference between the frequency shifted reference beam and the optical leakage between the pulses. However, the pulses also propagate through the heterodyne array circuit 28, and act to saturate the system electronics. Therefore, the pulses that are not used to measure the phase difference between the reference beam and the optical leakage are clipped by a pulse clipper circuit 32 to remove the pulses so that the only thing left in the signal is the optical leakage between the pulses and the reference beam. In one embodiment, the optical leakage between the pulses is about 45 dB down from the pulses. As is well known in the art of heterodyne detection, the optical leakage can be even smaller by having a more intense reference beam.

The combined reference beam and optical leakage is then sent to a phase sensor circuit 34 that measures the phase difference between the optical leakage and the reference beam for each fiber beam. The phase sensor circuit 34 provides a phase adjusting signal indicative of the phase difference between the optical leakage between each pulse in each pulsed fiber beam to each phase adjuster 18 to adjust the phase of the leakage between the pulses so that it is in phase with the reference beam. Therefore, the main beam will be coherent in that all of the fiber beams will be at the same phase. The phase sensor circuit 34 can be any phase sensor circuit suitable for the purposes described herein, such as those used for continuous wave laser array systems. Pulse clipper 32 and phase sensor circuit 34 are combined in phase locking electronics 36.

Further control of the phase differences between fiber amplifiers at higher power output is needed as shown by the diagrams of b and 2B.

Figure 2A:
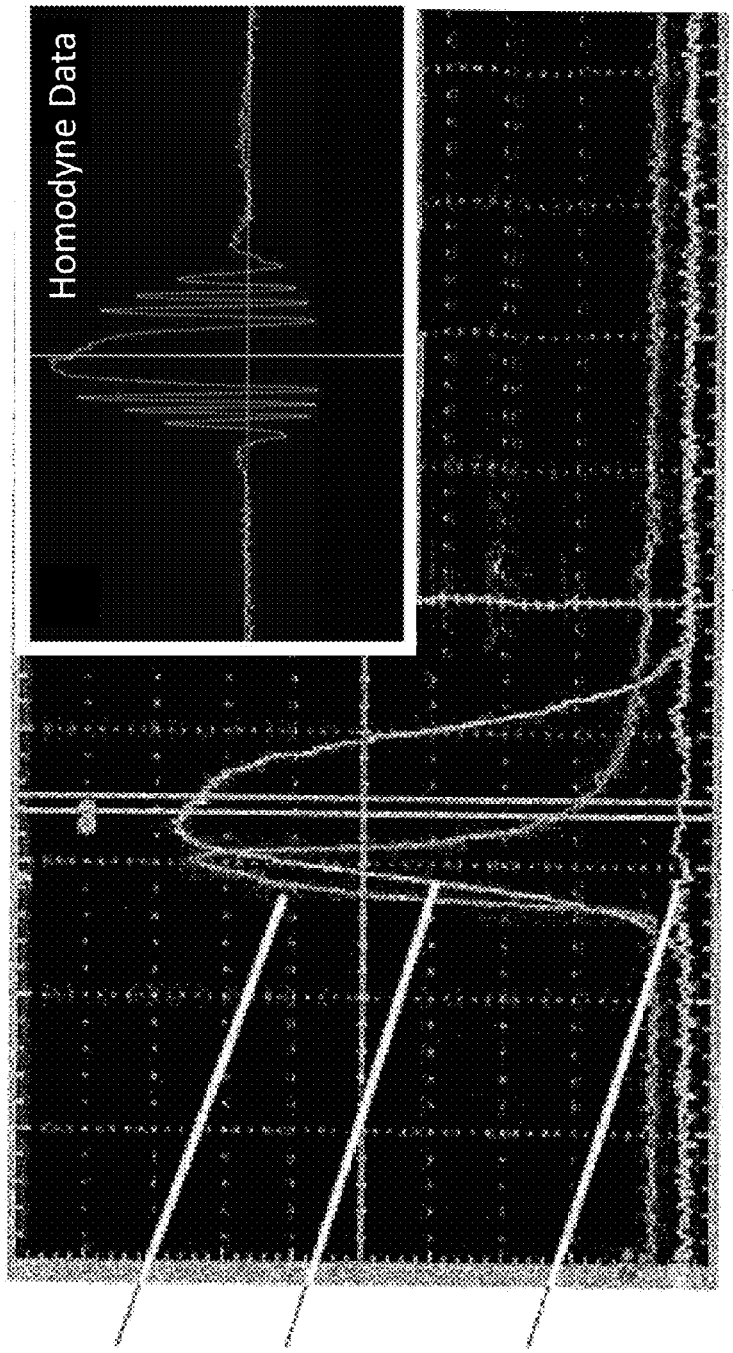
FIGS. 2A-2B depict the performance of a coherently phase system with two pulsed fiber amplifiers at different pulse energies.
Figure 2B:
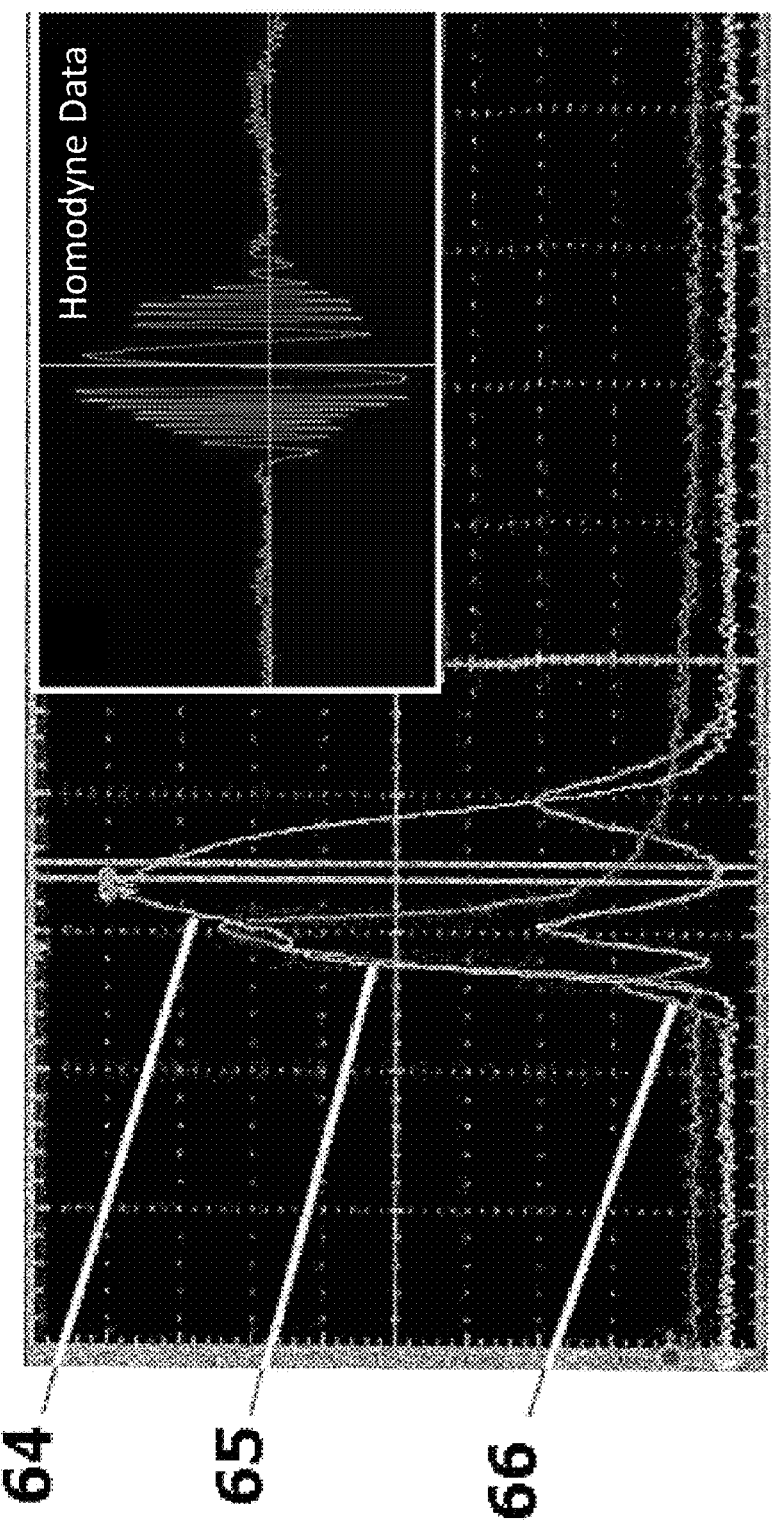

FIG. 2A depicts the performance of a coherently phase system with two pulsed fiber amplifiers combined at a 50/50 beam splitter at 40 μJ per amplifier chain. An electrical timing trigger pulse is indicated at 61, the in-phase output signal pulse is shown at 62 and the out-of-phase output signal pulse is shown at 63. It is clear from this diagram that there is very little interference from the out-of-phase signal at lower power, resulting in 99% temporal coherence fidelity. The inset diagram shows the corresponding measured homodyne signal of one of the fiber amplifiers generated by mixing the pulsed output with a CW reference. The trace shows that there is about 4 waves of phase excursion on both the rising edge and the falling edge of the optical pulse. The phase modulation is accumulated over the amplifier chain from self phase modulation and dynamic gain effects. Remarkably, even with phase modulation of approximately 4 waves, output phase are matched to better than $1/8^{th}$ wave over the optical pulse in order to achieve 99% temporal coherence fidelity. For the low pulse energy case depicted in FIG. 2A, only piston phase control is necessary for efficient coherent beam combining FIG. 2B depicts the performance of the fiber amplifier chain at higher pulse energy than FIG. 2A, 250 μJ per chain. The in-phase output signal is indicated at 64, the electrical timing trigger at 65 and the out-of-phase output signal at 66. As can be seen, the out-of-phase component has a much bigger effect on the output signal, resulting in only an 82% temporal coherence fidelity. The homodyne data of one of the amplifiers is shown in the inset diagram, and indicates about 8 waves of phase modulation on both the rising and falling sides of the optical pulse. At this high pulse energy, it was no longer possible to match the phase profiles of both amplifiers over the optical pulse to within $1/8^{th}$ of a wave with only piston phase control. As a result, 18% of the energy was not combined and was rejected in the out of phase port of the combining 50/50 beam splitter as shown by the out-of-phase output signal at 66. Hence, to recover the 18% combining loss, it is necessary to have intra-pulse phase control and intra-pulse amplitude control.

The piston control loop of FIG. 1 compensates for path length differences between non-shared optical paths of the parallel fiber amplifier chains. Next, control loops will be described that provide intra-pulse control to tailor the phase profile of the pulse itself.

Figure 3:
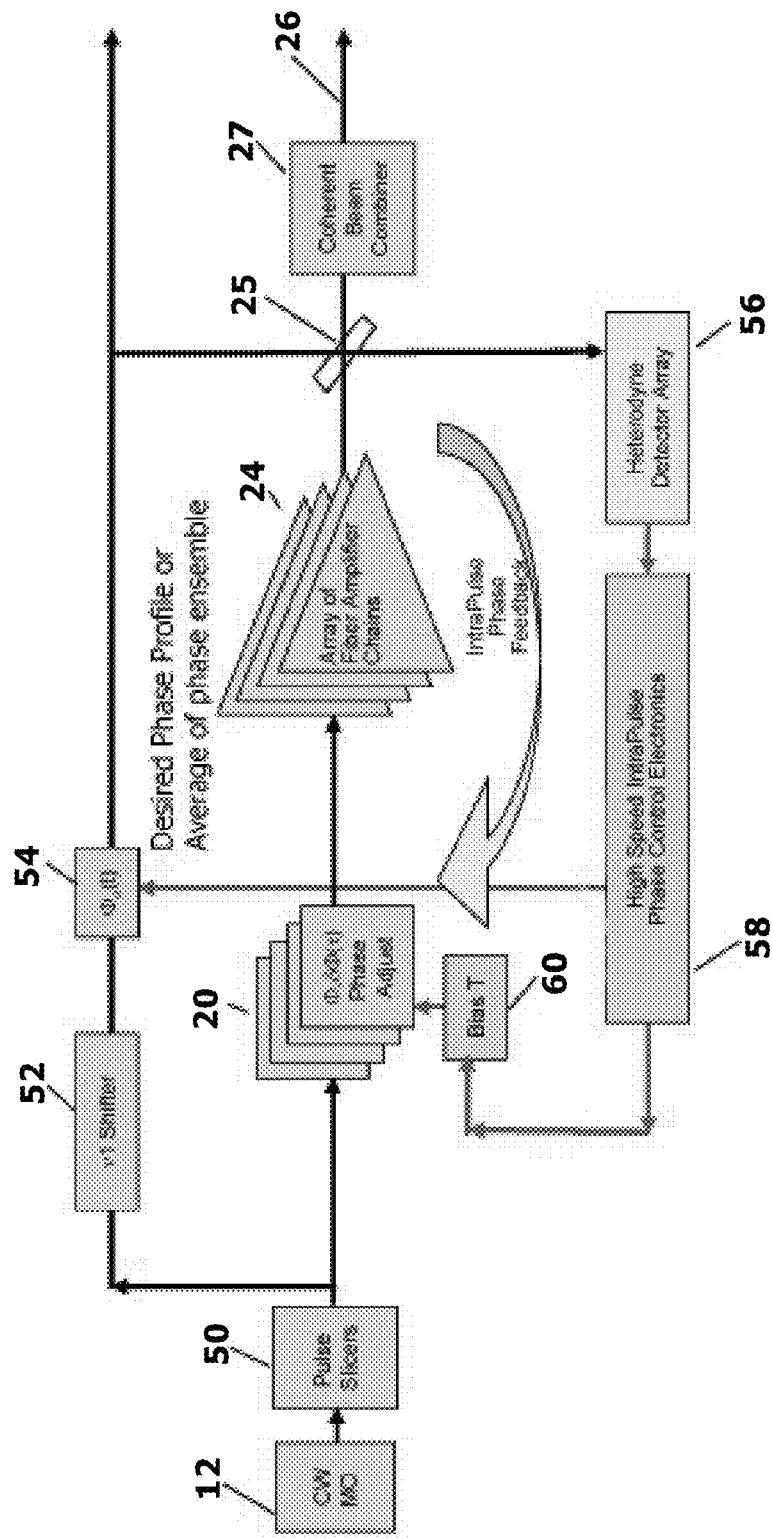
FIG. 3 is schematic block diagram of a pulsed fiber array laser with intra-pulse phase control according to an embodiment of the invention.

FIG. 3 depicts an embodiment of the present invention that expands on the prior art system of FIG. 1 by including an additional feedback loop to ensure that the phase profile within the optical pulses can be controlled and made identical among fiber amplifier chains. In order to achieve this for amplifiers with high phase variations within an optical pulse due to high intensity-length product (B-integral) as well as population induced phase modulation, high speed intra-pulse phase control is necessary.

In FIG. 3, like elements with FIG. 1 are identified by the same reference numeral. CW laser 12 generates a signal beam that passes through pulse slicers 50. The split pulses pass through an array of phase adjusters 20 and the array of fiber amplifier chains 24, then are combined in coherent beam combiner 27 and output at 26. A reference beam from pulse slicers 50 is sent through frequency shifter 52, then phase adjuster 54. The reference beam is combined with the output beam in beam splitter 25 then sent to heterodyne detector array 56 which is part of the additional feedback loop of this embodiment. Heterodyne array 52 is an array of photodetectors operable at speeds fast enough to resolve the phase variations within the optical pulse and receives inputs from the high speed reference beam and the fraction of the main beam. It is used to collect phase information of all fiber amplifier chains 24.

The feedback loop of FIG. 3 also includes high speed intra-pulse phase control electronics 58. Electronics 58 calculates appropriate corrections to all phase adjusters 20 to ensure that phase profiles within pulses between amplifiers are the same across the whole array. Any phase difference will lead to lower beam combining efficiency. Phase profiles across the array can be different due to variations in the amplifier chains, including fiber length, mode field diameter of fibers, pumping conditions and an insertion loss of optical components. Intra-pulse phase control electronics 58 provides feed forward control by using phase information from a prior pulse and correcting the phase of the current pulse. An output from intra-pulse phase control electronics 58 is sent to Bias T 60, which combines it with an output from phase locking electronics 36 of FIG. 1 (not shown). In an alternative embodiment, bias T 60 could be replaced with an additional array of phase adjusters in series with those indicated at 20. In another alternative embodiment, for waveguide electro-optical phase modulators, the electrodes can be segmented into two sections, one for the piston feedback section of FIG. 1 and the other for the intra-pulse phase control of FIG. 1.

The output phase profile of combined beam 26 can be tailored to a target profile by applying the desired phase profile $\Phi_0(t)$ to the reference beam using phase adjustor 54. For example, a chirp profile can be written on the output pulse to enable chirp LIDAR applications. Phase adjuster 54 is an electro-optical phase modulator that receives an input signal $\Phi_0(t)$ from intra-pulse phase control electronics 58. This input signal can provide for at least two ways to tailor the output phase profile. In one embodiment, intra-pulse phase control electronics deciphers the phase information from the heterodyne signal and calculates the appropriate feed back according to the equation $$\delta\Phi(\tau)=\Phi(\tau)-\Phi_0(t)$$

where $\Phi(\tau)$ is the measured phase from the previous pulse. This provides a fixed phase profile.

In an alternative embodiment, $\Phi_0(t)$ can be the average of the phase profile of all of the amplifier chains. For high pulse energy amplifiers with significant B integrals, large phase excursion is expected within $\Phi_0(t)$ and small excursions are expected within $\delta\Phi(\tau)$. This embodiment has an advantage that only one phase modulator with a large range is required and used in the reference arm. Large range modulators of more than two waves are currently difficult to make and relatively expensive.

The feedback loop of FIG. 3 can also be operated with no modification to the output phase profile of the combined beam.

Another effect that can degrade the performance of a pulsed fiber array, in particular, the efficiency with which fiber amplifiers can be combined, is amplitude variation between beams. Coherent combining efficiency is insensitive to power fluctuations directly since a 20% power variation between beams will result in only a 1% drop in efficiency. However, intensity induced phase changes such as those induced by self phase modulation and population induced phase modulation have a more pronounced effect on efficiency, especially for high energy pulsed fiber amplifiers.

Figure 4:
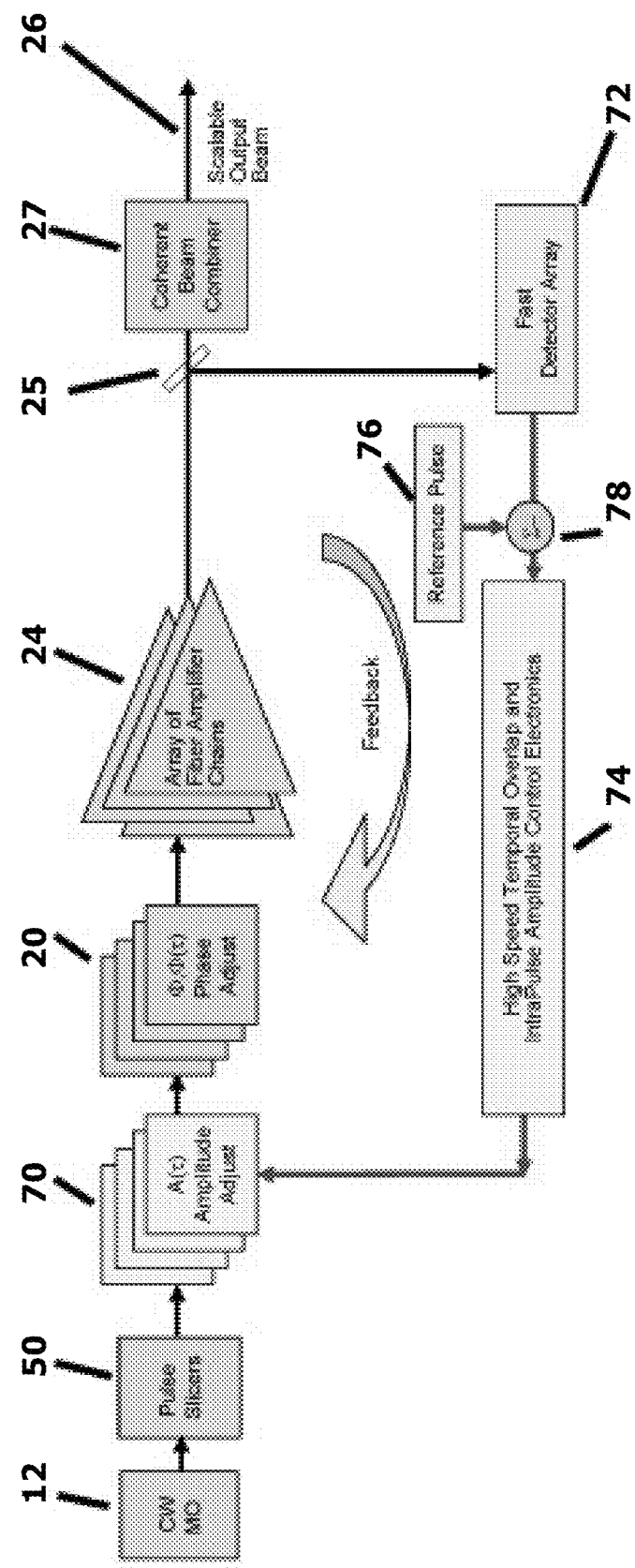
FIG. 4 is a schematic block diagram of a pulsed fiber array laser with high speed temporal overlap and intra-pulse amplitude control according to an embodiment of the invention.

For this reason, another embodiment of the present invention includes an additional feedback loop in which the high speed temporal overlap and intra-pulse amplitude can also be controlled as depicted in FIG. 4. Like elements with FIGS. 1 and 3 are identified by the same reference numeral. The purposes of the temporal amplitude feedback loop are first, to ensure that the intra-pulse amplitude after amplification is the same between amplifiers to lessen the effect of intensity induced phase changes and second, to compensate for any differences in time-of-flight between amplifiers because of path length differences. The temporal amplitude control loop has less impact on combining efficiency than the intra-pulse phase control loop of FIG. 3.

As depicted in FIG. 4, this embodiment also optionally includes an array of amplitude adjusters 70 between pulse slicers 50 and phase adjusters 20. A control signal for amplitude adjusters 70 is provided by high speed temporal overlap and intra-pulse amplitude control electronics 74, which receives input from fast detector array 72. Fast detector array 72 is an array of photodetectors operable at speeds fast enough to resolve temporal fluctuations within the pulse.

High speed electronics 74 determines the timing differences between the leading edge of the array of pulses from fiber amplifiers, as well as the temporal profile difference. Timing jitter is a feedback into amplitude adjustors 70 to ensure accurate timing between amplifiers. Amplitude profile difference for a particular amplifier is calculated by subtracting the high speed signal for that particular amplifier from the ensemble average of all amplifier array. Amplitude profile of the amplifier array may optionally be tailored to match to a reference electrical pulse 76, by first comparing the fast detector array signals to the reference electrical pulse 76 through a comparator 78.

Figure 5:
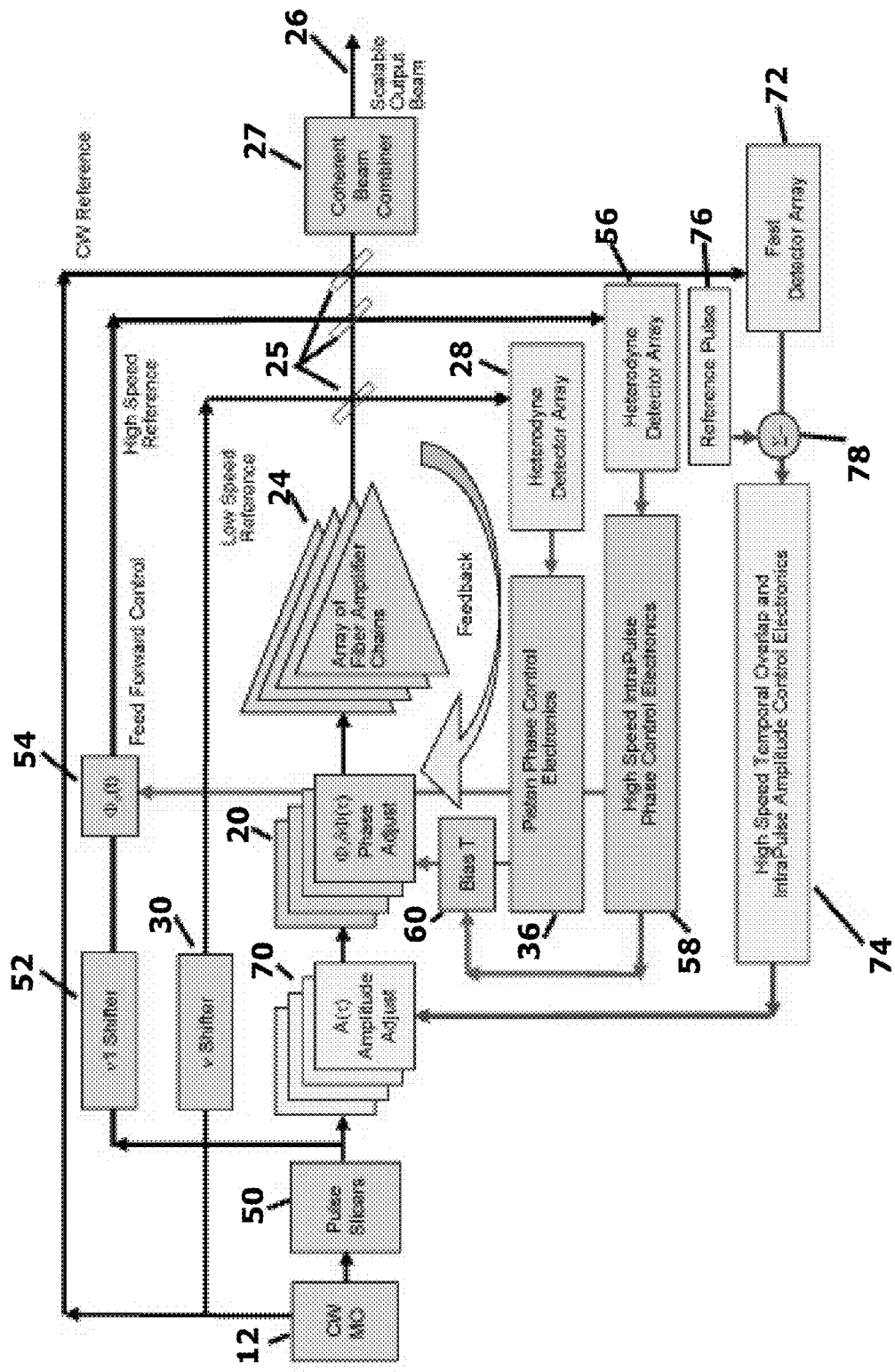
FIG. 5 is a schematic block diagram of a coherently phased fiber array architecture with intra-pulse phase and amplitude control.

FIG. 5 depicts a diagram of the combination for FIGS. 1, 3 and 4. In this figure, like elements have the same reference numerals. As explained above, CW Q-switched laser 12 is divided into a plurality of beams by pulse slicers 50. The beams travel through amplitude adjustors 70, phase adjustors 20, fiber amplifier chains 24, a series of beam splitters 25 then are combined with coherent beam combiner 27 to become output beam 26. Three feedback loops are shown, including that of FIG. 1, comprising heterodyne detector array 28 and piston phase control electronics 36. The second feedback loop of FIG. 3 comprises heterodyne detector array 56 and high speed intra-pulse phase control electronics 58. The output of electronics 36 and 58 are combined using bias T 60. Finally the feedback loop of FIG. 4 comprises fast detector array 72, reference pulse generator 76, comparator 78 and high speed temporal overlap and intra-pulse amplitude control electronics 74. Further details and alternatives to the elements of FIG. 5 are given above for FIGS. 1, 3 and 4.

Figure 6:
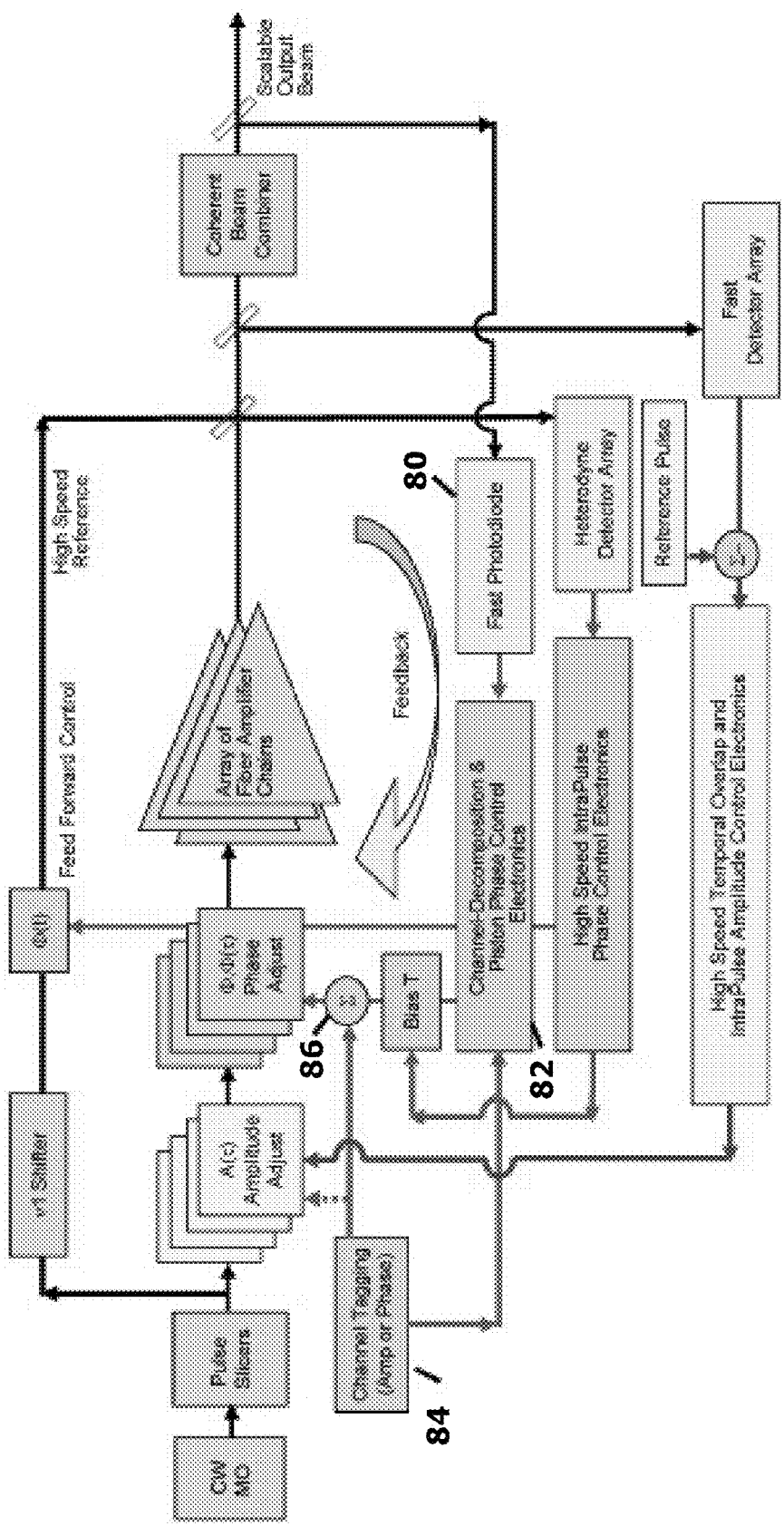
FIG. 6 is a schematic block diagram of a further embodiment of the apparatus of FIG. 5 using channel-tagging phase locking techniques.

As explained above, piston phase control is necessary to compensate for path length variations between non-common optical paths. These differences are mostly due to environmental disturbances such as local temperature fluctuations and acoustic vibrations. FIG. 1 depicts an approach to piston phase control that phase-locks the individual channels by sampling the output of each chain and missing it with a frequency-shifted CS reference beam, thereby extracting the piston phase via optical heterodyne detection. One problem with this technique is that it results in a passive fiber path can drift on its own. FIG. 6 depicts an embodiment of the present invention corresponding to the apparatus of FIG. 5 where heterodyne detector array 28 and piston phase control electronics 36 are replaced with fast photodiode 80 and channel-decomposition and piston phase control electronics 82.

The apparatus of FIG. 6 features a LOCSET (Locking of Optical Coherence by Single detector Electronic-frequency Tagging) technique. In this technique, the low-level coherent CW leakage (discussed with reference to FIG. 1) is phase modulated, with sinusoidal RF (radio frequency) signals for different amplifier chains at different RF frequencies for phase extraction identification. This modulation is not applied during the pulse so there are no intra-pulse modulation effects produced by the piston phase locking control loop. A fraction of the combined beam is detected by a single fast photodiode and contains the interference signals between the amplifiers. In frequency domain, the electrical signal from the fast photodiode consists of all the modulated sinusoidal signals and their sum and difference frequencies. By RF frequency decomposition of the fast photodiode signal, the piston phase error between amplifiers can be electronically determined in the channel-decomposition and piston phase control electronics 82. Channel Tagging 84 provides the set of orthonormal signals to the phase adjuster array and to the channel-decomposition electronics 82. As an alternative, CDMA (code division multiple access) and TDNA (time division multiple access) techniques could also be used for channel tagging instead of RF frequency tagging.

Figure 7:
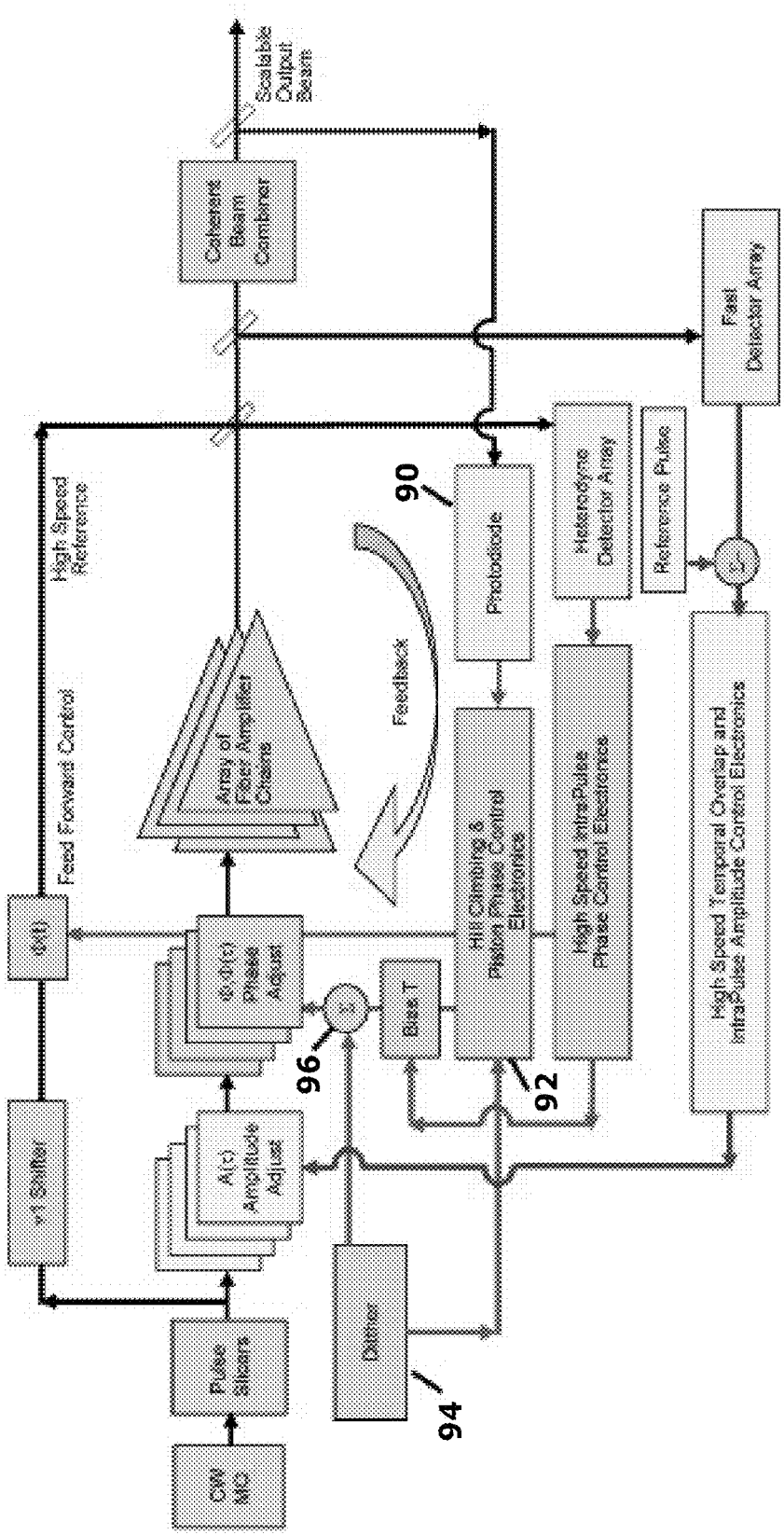
FIG. 7 is a schematic block diagram of a further embodiment of the apparatus of FIG. 5 using hill-climbing phase locking techniques.

An additional embodiment is depicted in FIG. 7. In this figure, like elements have the same reference numerals. FIG. 7 depicts an embodiment of the present invention corresponding to the apparatus of FIG. 5 where heterodyne detector array 28 and piston phase control electronics 36 are replaced with photodiode 90, hill climbing & piston phase control electronics 92, and dither 94. The hill climbing technique for phase control derives the feedback signals from the measured response of the combined beam to a set of small phase modulation dithers. A predetermined real-time slow dither sequence is preprogrammed in 94 and the dithers are applied to the phase adjusters at the summing electronics 96. A slow detector is used to detect a fraction of the combined beam and a electrical signal is sent to the hill climbing and piston phase control electronics 92, where the feedback signal is calculated and applied to the phase adjusters through the bias T 60. The technique of SPGD (stochastic parallel gradient descent) using a set of orthonormal dithers is optimal for fast convergence.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A coherently phase combined pulsed optical fiber amplifier chain array comprising:
    a phase adjuster in each amplifier chain, each phase adjuster receiving a phase adjusting signal, each phase adjuster adjusting the phase of an pulsed input signal beam;
    a piston phase controller for receiving outputs from the fiber amplifier chain array and generating a piston phase control signal;
    an intra-pulse phase controller for receiving a frequency-shifted reference beam and generating an intra-pulse phase control signal; and
    a combining element for receiving the piston phase control signal and the intra-pulse phase control signal and providing the phase adjusting signal to the phase adjusters for adjusting the phase of its input signal beam.

2. The apparatus of claim 1, wherein the piston phase controller further comprises:
    a channel tagging source for adding a channel tag to the pulsed input signal beam;
    a photodiode for receiving an amplified coherently phase combined output beam from the optical fiber amplifier chain array and converting it to an electrical signal; and
    channel decomposition electronics for receiving the electrical signal and the channel tag and providing the piston phase control signal to the combining element.

3. The apparatus of claim 1, wherein the piston phase controller further comprises:
    a dither source for adding a dither signal to the pulsed input signal beam;
    a photodiode for receiving an amplified coherently phase combined output beam from the optical fiber amplifier chain array and converting it to an electrical signal; and
    hill climbing electronics for receiving the electrical signal and the dither signal and providing the piston phase control signal to the combining element.

4. The apparatus of claim 1, wherein the intra-pulse phase controller further comprises:
    a detector array for receiving outputs from the fiber amplifier chain array and the frequency-shifted reference beam and converting them to an electrical signal; and
    high speed intra-pulse phase control electronics for receiving the electrical signal and providing the intra-pulse phase control signal to the combining element.

5. The apparatus of claim 4 further comprising:
    an amplitude adjuster in each amplifier chain, operatively coupled between the pulsed input signal beam and the respective phase adjuster, each amplitude adjuster receiving a pulsed input signal beam and an amplitude adjusting signal, each amplitude adjuster adjusting the amplitude of the pulsed input signal beam;
    a detector array for receiving the outputs from the fiber amplifier chain array and converting them to an electrical signal;

a reference pulse generator for generating a reference electrical pulse for modifying the amplitude profile of the amplitude adjusters;
a comparator for receiving the electrical signal and the reference electrical pulse; and
an intra-pulse amplitude controller for receiving the output of the comparator and generating the amplitude adjusting signal.

6. A pulsed laser array system comprising:
a beam generating sub-system for generating a pulsed signal beam and one or more reference beams that are frequency locked together;
a beam splitter for splitting the pulsed signal beam into a plurality of split pulsed signal beams for a plurality of fibers;
an array of amplifier chains including at least one amplifier for amplifying each split pulsed signal beam;
a phase adjuster in each amplifier chain, each phase adjuster receiving a phase adjusting signal;
a piston phase controller for receiving the amplified split pulsed signal beams generating a piston phase control signal;
an intra-pulse phase controller for receiving a frequency-shifted reference beam and generating an intra-pulse phase control signal; and
a combining element for receiving the piston phase control signal and the intra-pulse phase control signal and providing the phase adjusting signal to the phase adjusters for adjusting the phase of the split pulsed signal beams to be in phase with the reference beams.

7. The apparatus of claim 6, wherein the piston phase controller further comprises:
a channel tagging source for adding a channel tag to the pulsed signal beam;
a photodiode for receiving an amplified combined output beam from the array of amplifier chains and converting it to an electrical signal; and
channel decomposition electronics for receiving the electrical signal and the channel tag and providing the piston phase control signal to the combining element.

8. The apparatus of claim 6, wherein the piston phase controller further comprises:
a dither source for adding a dither signal to the pulsed signal beam;
a photodiode for receiving an amplified combined output beam from the array of amplifier chains and converting it to an electrical signal; and
hill climbing electronics for receiving the electrical signal and the dither signal and providing the piston phase control signal to the combining element.

9. The apparatus of claim 6, wherein the intra-pulse phase controller further comprises:
a detector array for receiving the amplified split pulsed signal beams and the frequency-shifted reference beam and converting them to an electrical signal; and
high speed intra-pulse phase control electronics for receiving the electrical signal and providing the intra-pulse phase control signal to the combining element.

10. The apparatus of claim 9 further comprising:
a phase adjuster for receiving the frequency-shifted reference beam and adding a phase adjustment according to a control signal from the high speed intra-pulse phase control electronics, wherein a output pulse can be given a desired phase profile.

11. The apparatus of claim 9 further comprising:
an amplitude adjuster in each amplifier chain, each amplitude adjuster receiving a split pulsed signal beam and an amplitude adjusting signal, each amplitude adjuster adjusting the amplitude of the split pulsed signal beam so that the amplitude of each split pulsed beam matches the amplitude of a reference electrical pulse;
a detector array for receiving the amplified split pulsed signal beams and converting them to an electrical signal; and
an intra-pulse amplitude controller for receiving the electrical signal and generating the amplitude adjusting signal.

12. A method of coherently phase combining an array of optical fiber amplifier chains, comprising the steps of:
generating a pulsed signal beam and one or more reference beams that are frequency locked together;
splitting the pulsed signal beam into a plurality of split pulsed signal beams for a plurality of fibers;
sending the split pulsed signal beams through an array of amplifier chains including at least one amplifier for amplifying each split pulsed signal beam;
providing a phase adjuster in each amplifier chain, each phase adjuster receiving a phase adjusting signal;
receiving the amplified split pulsed signal beams and generating a piston phase control signal;
receiving a frequency-shifted reference beam and generating an intra-pulse phase control signal; and
combining the piston phase control signal and the intra-pulse phase control signal and providing the phase adjusting signal to the phase adjusters for adjusting the phase of the split pulsed signal beams to be in phase with the reference beams.

13. The method of claim 12, wherein the step of generating a piston phase control signal further comprises:
adding a channel tag to the pulsed signal beam;
receiving an amplified combined output beam from the array of amplifier chains and converting it to an electrical signal; and
receiving the electrical signal and the channel tag and providing the piston phase control signal.

14. The method of claim 12, wherein the step of generating a piston phase control signal further comprises:
adding a dither signal to the pulsed signal beam;
receiving an amplified combined output beam from the array of amplifier chains and converting it to an electrical signal; and
receiving the electrical signal and the dither signal and providing the piston phase control signal.

15. The method of claim 12, wherein the step of generating intra-pulse phase control signal further comprises:
receiving the amplified split pulsed signal beams and the frequency-shifted reference beam and converting them to an electrical signal; and
receiving the electrical signal and providing the intra-pulse phase control signal.

16. The method of claim 15 further comprising the step of:
receiving the frequency-shifted reference beam and adding a phase adjustment signal, wherein a output pulse can be given a desired phase profile.

17. The method of claim 15 further comprising:
adjusting the amplitude of each split pulsed signal beam so that the amplitude of each split pulsed beam matches the amplitude of a reference electrical pulse in accordance with an amplitude adjusting signal;

receiving the amplified split pulsed signal beams and converting them to an electrical signal; and receiving the electrical signal and generating the amplitude adjusting signal.

* * * * *